(12) United States Patent
Barber

(10) Patent No.: US 6,653,004 B1
(45) Date of Patent: Nov. 25, 2003

(54) PROCESS CONTROL FOR MULTIPLE AIR SUPPLIES

(76) Inventor: Jeffrey Lewis Barber, P.O. Box 971, Indian Hills, CO (US) 80454

( * ) Notice: Subject to any disclaimer, the term of this patent is extended or adjusted under 35 U.S.C. 154(b) by 190 days.

(21) Appl. No.: 09/687,792

(22) Filed: Oct. 12, 2000

Related U.S. Application Data

(60) Provisional application No. 60/209,470, filed on Jun. 5, 2000, and provisional application No. 60/158,765, filed on Oct. 12, 1999.

(51) Int. Cl.[7] .............................. H01M 8/00; H01M 8/18
(52) U.S. Cl. ............................... 429/19; 429/12; 429/13
(58) Field of Search ................................ 429/12, 13, 19

(56) References Cited

U.S. PATENT DOCUMENTS

| | | | |
|---|---|---|---|
| 2,130,037 | A | 9/1938 | Skarlund |
| 3,583,286 | A | 6/1971 | Chiappulini et al. |
| 3,659,417 | A | 5/1972 | Grieb |
| 3,878,821 | A | 4/1975 | White |
| 4,066,002 | A | 1/1978 | Eastman |
| 4,325,331 | A | 4/1982 | Erickson |
| 4,907,950 | A | 3/1990 | Pierrat |
| 5,004,404 | A | 4/1991 | Pierrat |
| 5,114,321 | A | 5/1992 | Milburn et al. |
| 5,434,016 | A | 7/1995 | Benz et al. |
| 5,645,950 | A | * 7/1997 | Benz et al. .................. 429/13 |
| 6,077,620 | A | * 6/2000 | Pettit .......................... 429/26 |
| 6,190,791 | B1 | * 2/2001 | Hornburg ..................... 429/17 |
| 6,283,723 | B1 | 9/2001 | Milburn et al. |
| 6,306,531 | B1 | * 10/2001 | Clingerman et al. .......... 429/15 |
| 6,338,912 | B1 | * 1/2002 | Ban et al. ..................... 429/34 |

FOREIGN PATENT DOCUMENTS

| | | |
|---|---|---|
| EP | 184042 A3 | 11/1986 |
| EP | 269-882 A | 6/1988 |

OTHER PUBLICATIONS

Milburn et al., "A Variable Displacement Compressor/Expander for Vehicular Fuel Cell Air Management," SAE Technical Paper Series 961713, 8/95, pp63–69.

Milburn., "Introducing a High Efficiency Variable Positive Displacement Automotive Supercharger," SAE Technical Paper Series 940845, 2/94, pp 1–11.

Close et al., "The New Collins Compact Scotch Yoke Engine," SAE Technical Paper Series 920675, 2/92, pp91–99.

Aitken et al., "The CMC Scotch Yoke–Engine—A Family of Engines for Automotive Use," SAE Technical Paper Series 901532, 8/90, pp 1–18.

* cited by examiner

Primary Examiner—Randy Gulakowski
Assistant Examiner—Donald V Scaltrito
(74) Attorney, Agent, or Firm—Charles E. Rohrer

(57) ABSTRACT

Fuel Cell Powering system and method minimizing the number of motive drive sources and controlling fuel/air ratios by employing differentials including variable speed mechanisms between compressors and between compressors and expanders; by utilizing flow control devices for separate fluid streams including separate exhaust streams; by utilizing independent compressor/expander chambers; and by injection of water into exhaust streams prior to expansion.

100 Claims, 12 Drawing Sheets

PROCESS CONTROL FOR MULTIPLE AIR SUPPLIES

This application claims the benefit of Provisional Patent Application Nos. 60/158,765, filed Oct. 12, 1999 and 60/209,470, filed Jun. 5, 2000.

RELATED PATENT APPLICATION

U.S. patent application Ser. No. 09/687,793 titled "Variable Timing Valves for Gas Compressors and Expanders," filed concurrently herewith on Oct. 12, 2000, now U.S. Pat. No. 6,443,717B1, issued Sep. 3, 2000.

FIELD OF THE INVENTION

This invention relates to fuel cell powering systems, especially with regard to meeting the dynamic requirements of fuel and air supply subsystems.

BACKGROUND OF THE INVENTION

Fuel cell powering systems have the potential to become an economically viable means of converting chemical energy to electrical energy. For example, in a polymer-electrolyte membrane (PEM) fuel cell, also known as a proton exchange membrane fuel cell, hydrogen and oxygen are the elements to be combined in the production of electrical energy. Air is the customary source of oxygen while the oxidant can be hydrogen or a source of hydrogen such as methane, natural gas or other hydrocarbons. The fuel source may require a local refining process to produce hydrogen and the refining apparatus will include or be called a reformer. The energy conversion in the fuel cell occurs through a process of oxidation, which relies upon the pressurization of both the oxidant, and the oxidizing agent.

Electrical powering systems utilizing fuel cells are comprised of several subsystems requiring the compression of air and/or other gases in order to operate. Each of these subsystems operates best under distinctly different pressure profiles. As a result, the common approach is to utilize a complete gaseous supply system, including a compressor, a drive motor, a motor controller and perhaps an expander for each subsystem in order to meet the unique pressure requirements of each. Such a solution, however, is a significant source of cost, size and inefficiency since it creates a large size power unit with each gaseous supply subsystem operating as a parasitic user of developed electrical energy. If each subsystem is separate, each contributes to the component costs for the fuel cell powering system including auxiliary drive motors and speed controllers for each subsystem. In recognition of these fixed cost drivers, the primary means in which this invention purports to obtain system cost reduction and simplification is through the integrating of both the fuel delivery pump/compressor (gas or liquid) and the air delivery pump/compressor onto the same powered drive train. The immediate cost benefit to integrating the fuel and air pumps onto a common drive is the elimination of multiple electric drive motors and associated motor speed controllers.

To avoid the need for multiple air and fuel supply apparatus, it is preferable, from the perspective of reducing the system complexity, for all compressed air and gaseous fuel consuming subsystems to operate at the same common pressure. A common system pressure requirement enables all of the subsystem gaseous supply needs to be met with a single, appropriately sized compressor. However, while it may be possible for some powering systems to force the various subsystems to operate at a common pressure, such an operating strategy usually entails a large sacrifice in the performance of some or all of the fuel cell subsystems. The result is a solution that saves space but does so at the cost of system efficiency. Additionally, such a solution may also result in an unacceptable loss of flexibility for many applications and is therefore inappropriate in those cases.

SUMMARY OF THE INVENTION

Briefly stated, this invention provides for driving both the fuel (oxidant) compressor and the air (oxidizing agent) compressor from the same motor driveshaft and if expanders are included in system design, returning energy from the fuel supply subsystem and/or the air supply subsystem to the motor driveshaft either directly or indirectly.

While system cost is greatly reduced by driving both the fuel and air compressors with a single drive motor, flexibility must be preserved in providing the separate mass flow and pressure requirements of each subsystem. Various embodiments are described herein for meeting flexibility requirements including differential transmissions, variable speed transmissions, throttle and bleed valves, compressors and expanders with multiple, independent inlets and outlets, utilization of variable flow control techniques including flow directional control and combinations of these approaches, together with speed control of the drive motor with feedback signals incorporated into a servo system. Finally, the inventive methods and system incorporate water management techniques further improving system efficiency.

DETAILED DESCRIPTION

Figure 1:
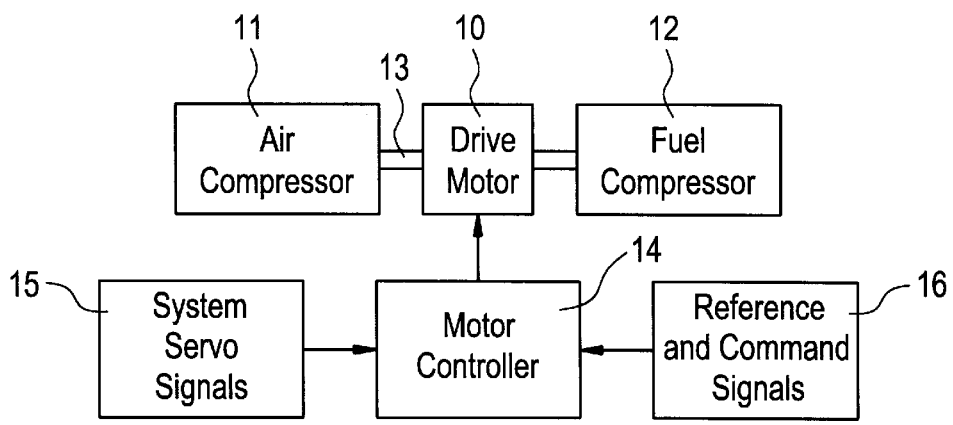
FIGS. 1 and 2 show an air and fuel compression system driven by a single drive motor.
Figure 2:
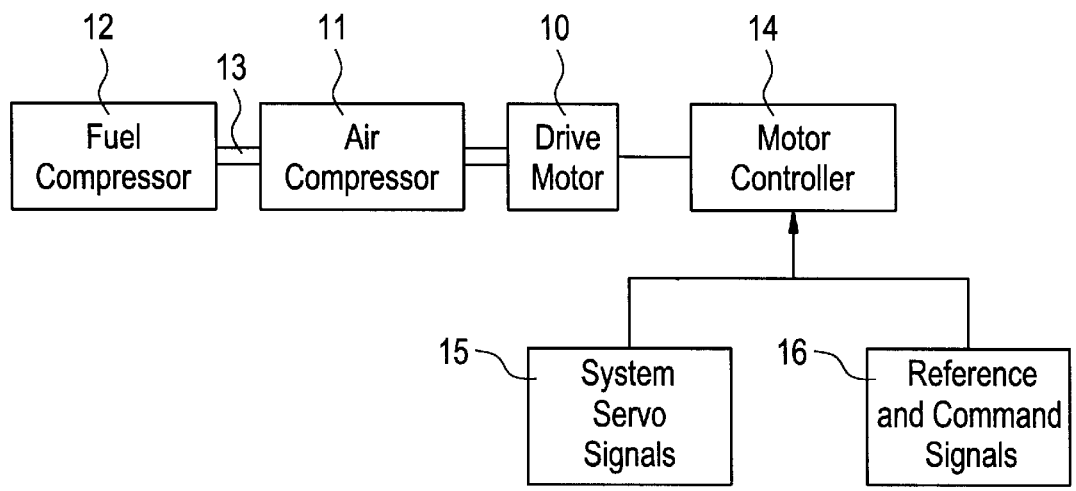

FIGS. 1 and 2 show a drive motor 10 driving an air compressor 11 and a fuel compressor 12 through a common drive shaft 13. A motor speed controller 14 is used to amalgamate feedback signals, system servo signals 15, and the reference and command signals 16 to determine the speed of motor 10 at any instant in time. Complex fuel cell powering requirements, such as are found in vehicular systems, need the feedback, reference and command input to accomplish the idling, acceleration, deceleration, braking and constant velocity functions found in vehicular systems. Systems without such stringent requirements may not need anything more than a simple motor controller 14.

FIGS. 1 and 2 show the simplest configuration of a single drive motor 10 with air and fuel compressors 11 and 12. Either configuration is implemented with a common shaft 13 through which both compressors are driven thus providing for the lowest cost as well as the smallest system package volume. Both cost and packaging are important considerations for fuel cell powering systems, whether they are stationary or automotive.

Figure 3:
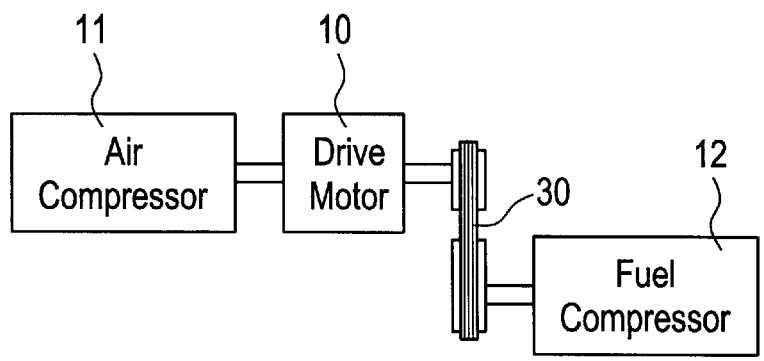
FIGS. 3 and 4 show the use of a differential speed drive in the systems of FIGS. 1 and 2.
Figure 4:
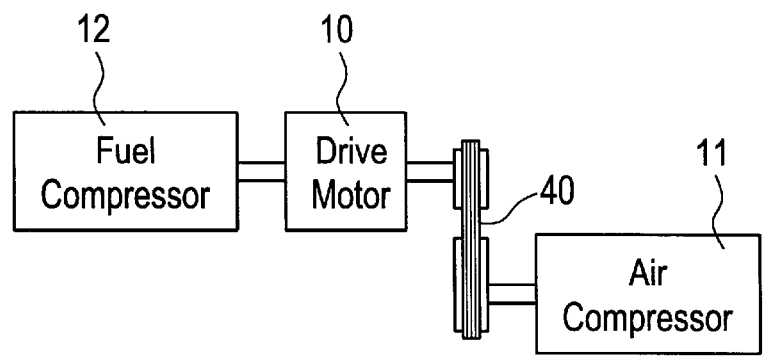

An alternative drive configuration, though somewhat more complex and bulky, is shown in FIG. 3. FIG. 3 illustrates a single motor 10 that directly drives the primary air compressor 11, but utilizes a belt and pulley arrangement 30 to obtain a differential speed change for the fuel pump/compressor 12. This approach can be reversed, as shown in FIG. 4, with the drive motor speed matched to the fuel pump/compressor 12 and the air compressor 11 driven at a different speed through the use of a belt and pulley arrangement 40. Optimization of system parameters, such as motor speed, available voltage, and critical flow control parameters dictate the preferred configuration for a particular application. Obviously, a gear arrangement or other suitable scheme can be used in place of the belt and pulley shown in FIG. 3.

Major problems for some fuel cell powering systems result from the significant changes needed in the fuel to air flow ratios during performance such as when fuel cells are used for vehicular propulsion. Ratios are dependent upon operating conditions and there are large changes needed in the fuel/air flow ratio during start-up, acceleration, deceleration, idle and full power, as well as longer term ratio changes to compensate for component deterioration. Meeting those dynamic, changing flow requirements is one of the apparent weaknesses of the systems shown in FIGS. 1 and 2 which provide a rigid, fixed drive ratio between the fuel supply mechanism and the air supply mechanism. Without other system control components added to the configuration, this weakness can prevent an integrated air and fuel delivery system from meeting all of the necessary requirements of the fuel cell powering system.

Figure 5:
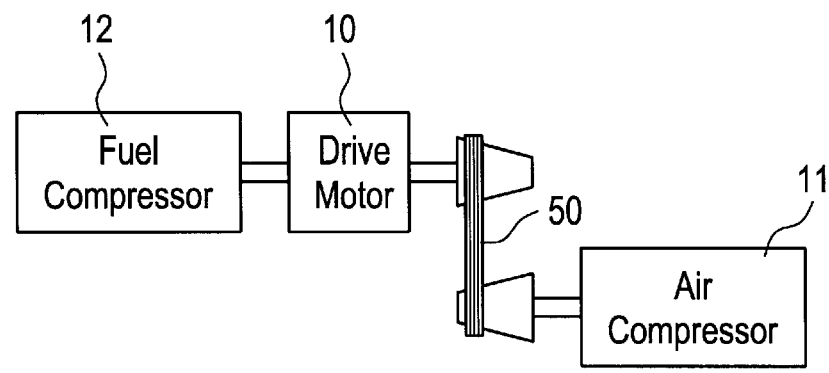
FIG. 5 illustrates a variable speed transmission for use in the systems of FIGS. 3 and 4.

Examples of system control approaches which provide the necessary flexibility in the delivered fuel/air flow ratios are shown in the configurations of FIGS. 3 and 4, and especially in the addition of a variable speed mechanism, exampled by the belt and pulley arrangement 50, as shown in FIG. 5. The approach shown in FIG. 5 allows for different speed ratios between the fuel supply and air supply subsystems to be dynamically created, thereby providing changes in the fuel/air flow ratio as needed during operation of the system. That result is accomplished by controlling the variable speed mechanism 50 which can take many forms in addition to pulleys, e.g., a variable speed gear train.

The motor controller and servo, reference and command signals are not shown in FIGS. 3, 4 and 5 but if included in a system, would be used in a manner like that shown and explained with respect to FIGS. 1 and 2.

Figure 6:
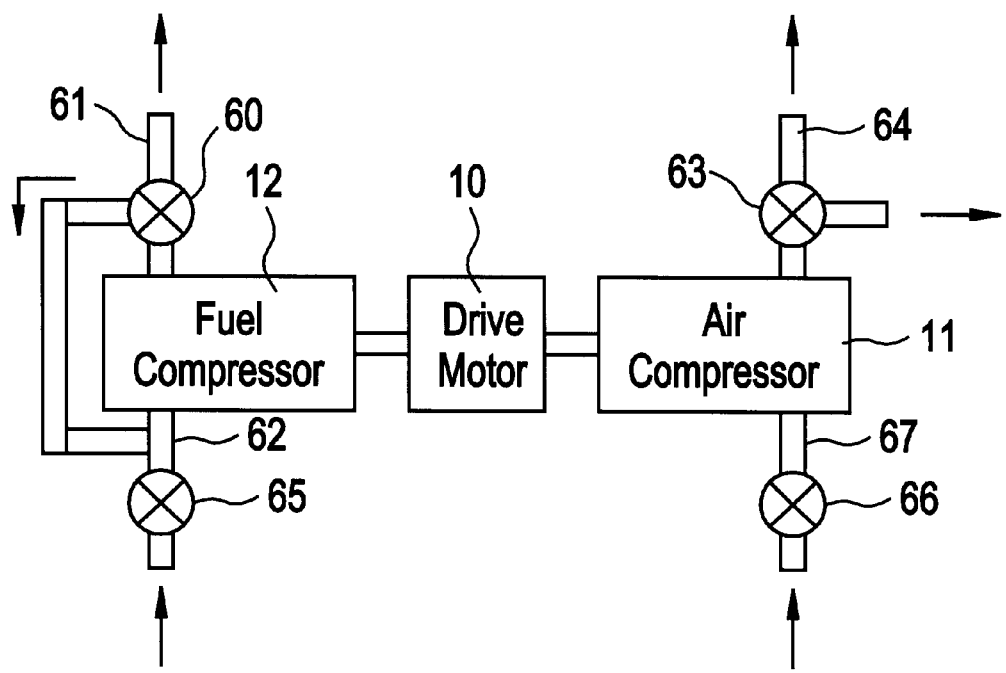
FIG. 6 shows the use of bypass valves, vents, and throttling valves to control mass flow and pressure in the systems of above figures.

One approach, economical where non-recoverable energy losses are acceptable, is to provide different fuel/air ratios through using bypass or vent valves. FIG. 6 shows bypass valve 60 situated in the outlet line 61 of fuel compressor 12. When opened, valve 60 allows a portion of the output of the fuel compressor 12 to be shunted back to the compressor inlet line 2. Vent valve 63 is located in the outlet line 64 of air compressor 11. When opened, a portion of the output of air compressor 11 is allowed to escape to the atmosphere. Note also a throttling valve 65 located in the inlet line 62 of fuel compressor 12 and throttling valve 66 located in the inlet line 67 of air compressor 11.

FIG. 6 shows flow control mechanisms placed on the inlet or the discharge or both of either the fuel supply or air supply subsystems, or both, in order to meet the flow requirements of the fuel cell powering system. An example of a control strategy of this type during transient flow conditions is as follows. During a transient condition calling for increased power output from the fuel cell system, a command is given to increase drive motor speed. The command also calls for bringing the mass flow of the flow-limiting device up to the appropriate predetermined output level. As the desired output level is approached, the quantity of mass flow from the other, non-flow limited device is in excess of the amount required. The excess flow of the non-limited fluid is reduced by passing a portion of the compressed flow back to the pump/compressor's inlet or by venting it to the atmosphere. An alternative flow control approach for the non-flow limited device is to prevent the fluid from entering the compressor through the use of an inlet restriction mechanism, such as a throttle.

The motor controller and servo, reference and command signals are not shown in FIG. 6 but if included in a system, would be used in a manner like that shown and explained with respect to FIGS. 1 and 2.

FIG. 6 illustrates an integrated common drive fuel compressor 12, air compressor 11, and drive motor 10, with inlet throttling devices 65 and 66 and discharge bleed valves 60 and 63, one on each of the compressors. FIG. 6 represents an arrangement with an unusually high multiplicity of flow control mechanisms in order to show various alternatives for a fuel/air/flow control configuration that is driven by the needs of the overall powering system. A consequence of implementing any of the flow control mechanisms shown in FIG. 6, is a significant increase in the air/fuel delivery system's efficiency over a system without these mechanisms. However, venting pressurized streams and restricting inlet flow both represent non-recoverable energy losses. Therefore, there is a need for the duration or magnitude of these temporary energy losses to be sufficiently short, so that those losses are negligible from the perspective of the overall fuel cell powering system. In general, restricting the inlet or venting the pressurized discharge of a fluid pump, liquid or gaseous, generates large losses proportional to the degree of the restriction or venting.

An alternative approach for a fuel cell powering system that cannot accept the sustained efficiency losses of the venting and/or restricting approach described above is shown in FIG. 7. The approach of FIG. 7 can be described in general, by providing the fuel or air supply mechanisms, or both, with independent, isolated pumping and/or compression volumes. This type of system makes use of multi-piston compressors or multi-diaphragm compressors.

Figure 7:
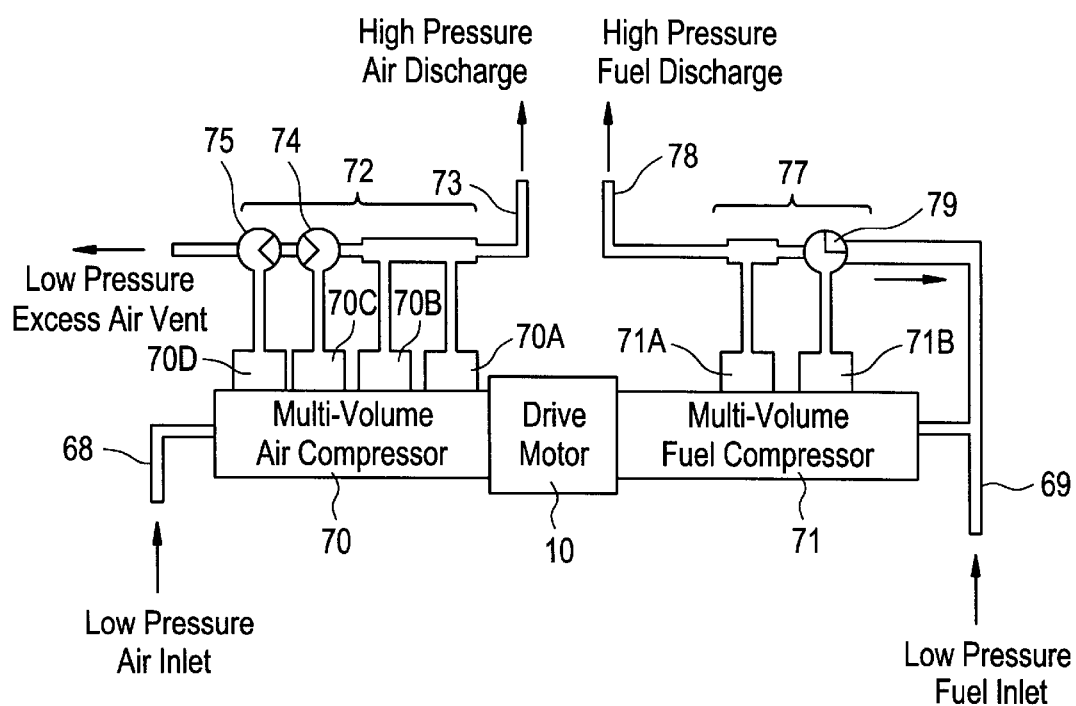
FIG. 7 illustrates a multi-volume compressor arrangement for supplying air and fuel under the control of directional and proportional valves.

FIG. 7 shows drive motor 10 connected to drive both multi-volume air compressor 70 and multi-volume fuel compressor 71. Multi-volume air compressor 70 shows a four volume output which may be, for example, the separate output of each one of four chambers 70A–70D as shown in FIG. 7. These separate outputs may be combined in a manifold 72 such that some or all of the output of chambers 70C and 70D add to the high pressure air discharge line 73.

Directional flow control valves 74 and 75 determine the amount of fluid from chambers 70C and 70D that is used to add to the discharge line 73. Depending on the setting of valves 74 and 75, some or all of the output of chambers 70C and 70D can be routed to low pressure air vent 76. Air inlet line 68 is connected to air compressor 70.

FIG. 7 also shows a multi-volume fuel compressor 71 with a two volume output which may be, for example, the separate output of each one of two chambers 71A and 71B. These separate outputs may be combined in a manifold 77 such that some or all of the output of chamber 71B adds to the high pressure fuel discharge line 78. A proportional flow control valve 79 determines the amount of fluid from chamber 71B that is used to add to the discharge line 78. Depending on the setting of valve 79 some or all of the output of chamber 71B can be routed back to the inlet line 69 of fuel compressor 71.

The approach illustrated in FIG. 7 is characterized by an effort to reduce the fuel and/or air mass that has unnecessary work of compression performed on it. Given multiple, independent compression volumes, the speed of the drive train is increased to bring the flow-limiting device up to the necessary output level. The excess pressurized flow, from the non-flow limited device, is reduced or eliminated by redirecting the discharge flow of one or more of the unnecessary compression volumes to the inlet or ambient. If there is no inherent internal compression in the device, such as found with fluid pumps or passively valved compressors, then there is no specific compression work lost in the process. Instead, the losses are limited to the energy required to inlet the "excess" fluid quantity and then discharge it at the same inlet pressure, typically referred to as pumping losses. This approach avoids the additional energy required to compress the excess flow after inletting, which is then "lost" when the excess flow is vented back to the low pressure inlet or ambient through a flow control mechanism.

FIG. 7 illustrates a control strategy in which the fuel supply starts out as the flow limiting parameter, and through manipulation of the flow control mechanisms, air becomes the flow limiting parameter. This is a reasonable approach where the mass flow rate of fuel is much less than that of the air flow rate, and as a consequence, the amount of energy required to pressurize the fluid streams are different. It is a more efficient powering system to over-pressurize 1 gram of fuel than the alternative of 10 grams of air mass. To accomplish this approach, the flow from one or more of the air compression volumes is bypassed back to the inlet and prohibited from being compressed, thereby reducing the magnitude of energy loss and becoming the flow limiting parameter. The appropriate mass of air is obtained by adjusting the speed of the air compressor. At this point in the process, the proportionally small amount of excess fuel, and its associated compression loss, is either bypassed back to the inlet or the inlet is restricted, incurring the associated increase in pumping losses.

A logical extension of the system configuration disclosed above is to integrate as many of the fuel cell powering system parasitic auxiliary loads as possible onto a single motor drive train. Examples are the humidification pumps and injectors, coolant recirculation pumps, heat exchanger fans and blowers. The additional power capacity that is needed for the drive motor to sustain all of these loads is minimal due to the fact that the energy required to provide for the pressurized air needs of the fuel cell powering system is the single most dominate parasitic load of the entire system. Strategies disclosed above are used to provide for a cost effective means of matching the various flow requirements of the fuel cell powering system during startup, steady state and transient operation.

Another use of the multi-volume approach is to use a configuration with an expander unit where the inlet volumes can be readily isolated one from another. This approach is shown in a 4-inlet expander in FIG. 8.

Figure 8:
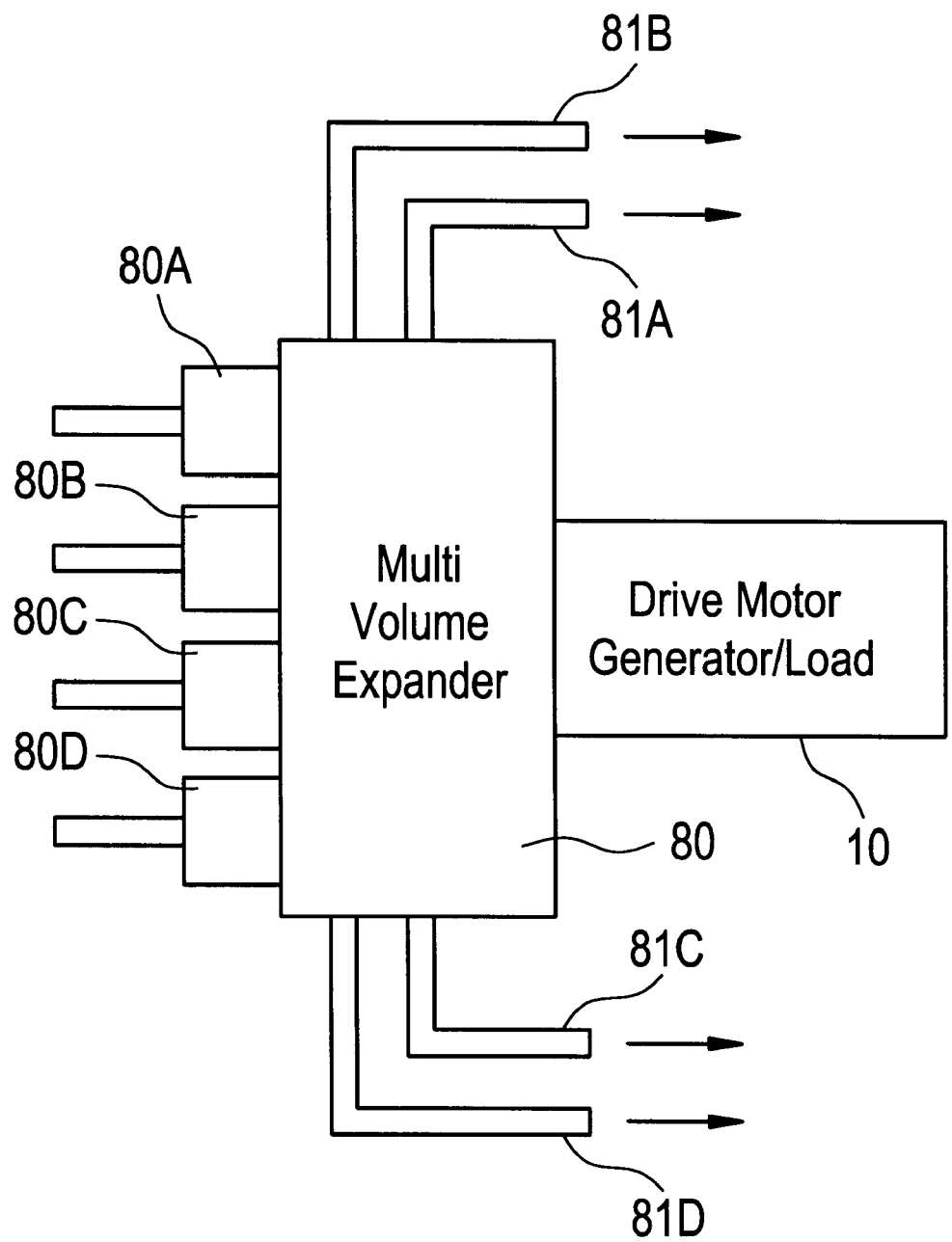
FIG. 8 shows a multi-volume expander.

FIG. 8 shows a drive motor 10 connected to a multi-volume expander 80 with a four volume input, which is the separate input to each of the four chambers 80A–80D. Four separate expander outlet lines 81A–81D are also shown in FIG. 8. If all of the output lines 81A–81D carry air they may be combined and vented to the atmosphere. However, if one or more expander outlet line carries a volume of the exhaust product of a reformer, it may be more appropriately connected to some other system element.

Isolation of the compressor outputs and/or expander inputs provides for the creation of separated, distinct pressure streams. With the addition of flow control valves, highly adjustable flow ratios between the streams of different pressure are made possible.

A solution for tailoring the specific mass flow needed in a subsystem is to adjust the mass flow out of a compressor or into an expander by adjusting the displacement of the chamber. In a piston fluid displacement apparatus, that may be accomplished by adjusting the size of the cylinder bore and/or length of the piston stroke within each compressor and/or expander. This can result in the situation where no two bores or piston strokes are the same within a specific integrated fuel cell air system.

This type of independent pressure and flow flexibility with compressors and/or expanders can be achieved, if desired, by combining or stacking them onto a common drive train in a sequential and/or compounded fashion. Such an arrangement can be a useful space saver and efficiency generator in many applications. Flow bypass devices on some or all of the compressor/expander components can be used if needed. Also, because of the improved flow control and flow separation obtainable with this solution, a single controller for the drive motor is sufficient to provide flow management and pressure management. The result is a much simpler control strategy for the powering system, leading to improved system performance while simultaneously achieving space reduction, cost reduction and efficiency.

As mentioned above, adjusting the size of the cylinder bore is one way to implement variable flow control. Traveling cylinder variable displacement devices are described in U.S. Pat. Nos. 5,004,404 and 5,114,321. An alternative approach is to implement variable valve timing on some or all of the compression and/or expansion volumes of the integrated fuel cell air supply system as described in U.S. Pat. No. 6,443,717B1 filed concurrently herewith.

Implementation of a variable timing valve mechanism on a compressor enables the inlet volume to be unloaded prior to the compression process for those compression volumes that pump to a gas stream. This type of flow control reduces the energy consumption of the integrated fuel cell air supply system for that unique operating condition.

Implementation of a variable timing valve mechanism on an expander allows precise, independent, dynamic pressure control for each subsystem volume. This approach provides for such a high degree of pressure control that the current practice of implementing a back-pressure or loading valve becomes redundant and unnecessary. Specifically, the large energy losses that a back-pressure valve imposes on the fuel cell powering system can be avoided for most applications.

Implementation of variable flow control on the expansion volume enables the integrated fuel cell air supply system to rapidly compensate for sudden state changes in the subsystem gas stream in contrast to current fuel cell powering systems which are a complex balance of several different subsystem pressures. If the balance is disturbed, the continued operation of the fuel cell powering system is jeopardized, and during transient and startup conditions, the temperature of the gas stream, as well as the molecular makeup of that stream, is likely to vary greatly upon entering the expander. The consequence of that variation in temperature, mass ratio and mass quantity at the expander inlet is that the fuel cell subsystem pressure would also vary greatly, unless active measures are taken, such as the provision of a dump valve, or the previously described variable flow valve. With fixed flow expanders integrated with the fuel cell air supply system compressor and common drive motor, a variable opening dump valve is required for each fuel cell subsystem in order to provide accurate overpressure prevention control. For some fuel cell air supply systems, it may even be necessary to implement overpressure control at both the compressor discharge and expander inlet for some or all of the subsystems to account for all of the possible variations of pressure, temperature, and mass between the fuel cell subsystems.

Figure 9:
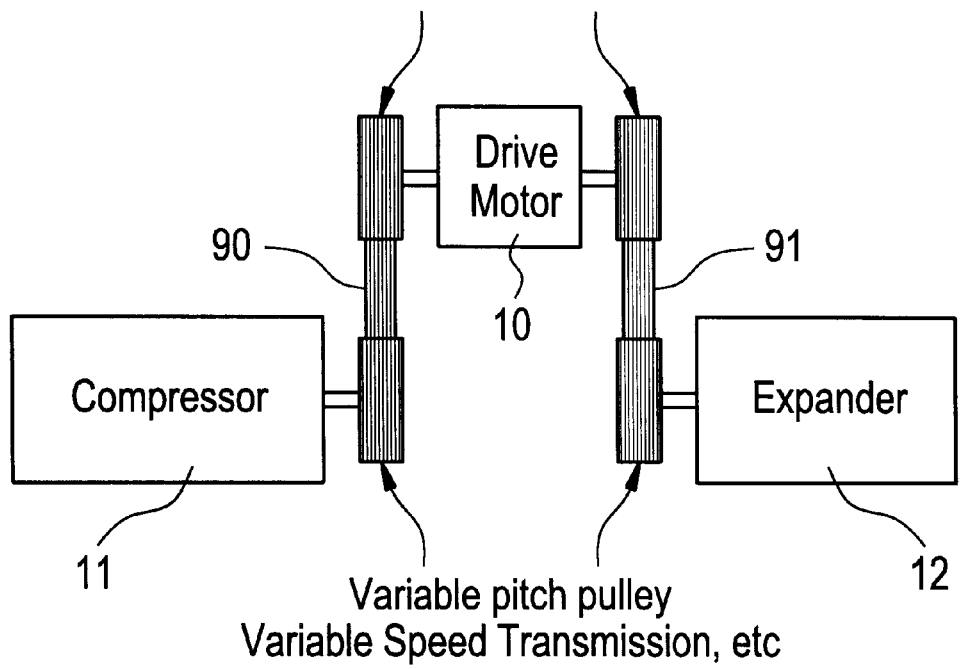
FIG. 9 shows a compressor and expander each with variable speed transmissions.

An alternative for providing variable flow and flow independent pressure capability with fixed geometry compressors and/or expanders, is to implement variable speed ratio capability on some or all of the components within an integrated fuel cell air supply system as shown in FIG. 5. Adjustable pulleys or continuously variable transmissions are means of providing variable speed, and therefore variable flow capability, within an air supply system composed of fixed geometry compressors and/or expanders. FIG. 9 is similar to FIG. 5 but FIG. 9 shows the use of variable transmissions 90 and 91 on both a compressor and an expander.

Figure 10:
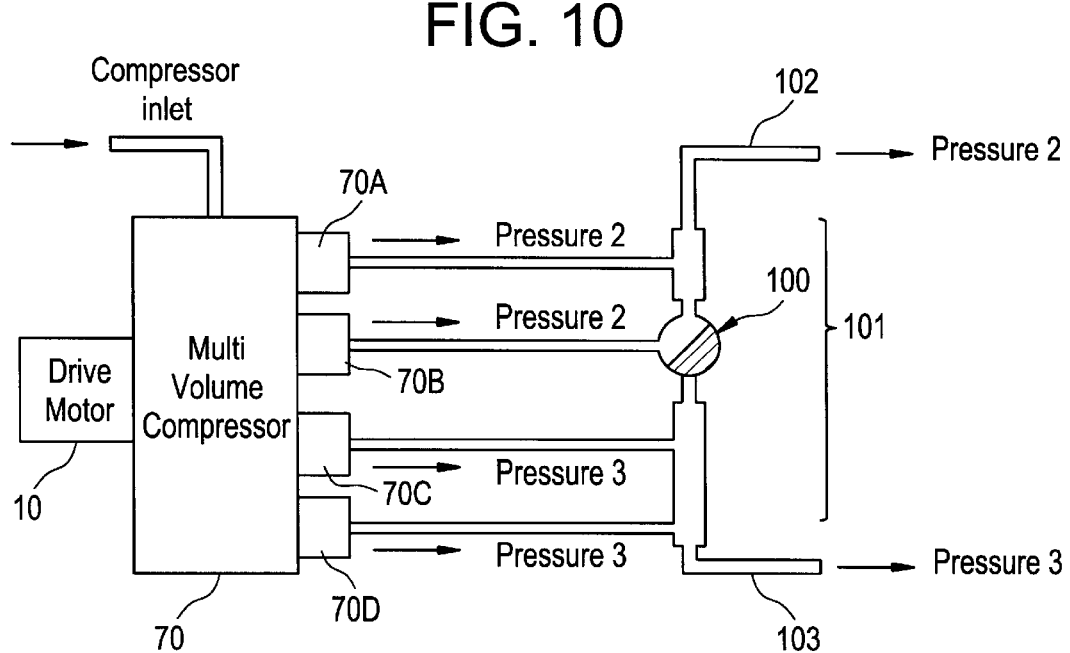
FIGS. 10 and 11 provide a flow control scheme for compressors and expanders, respectively.
Figure 11:
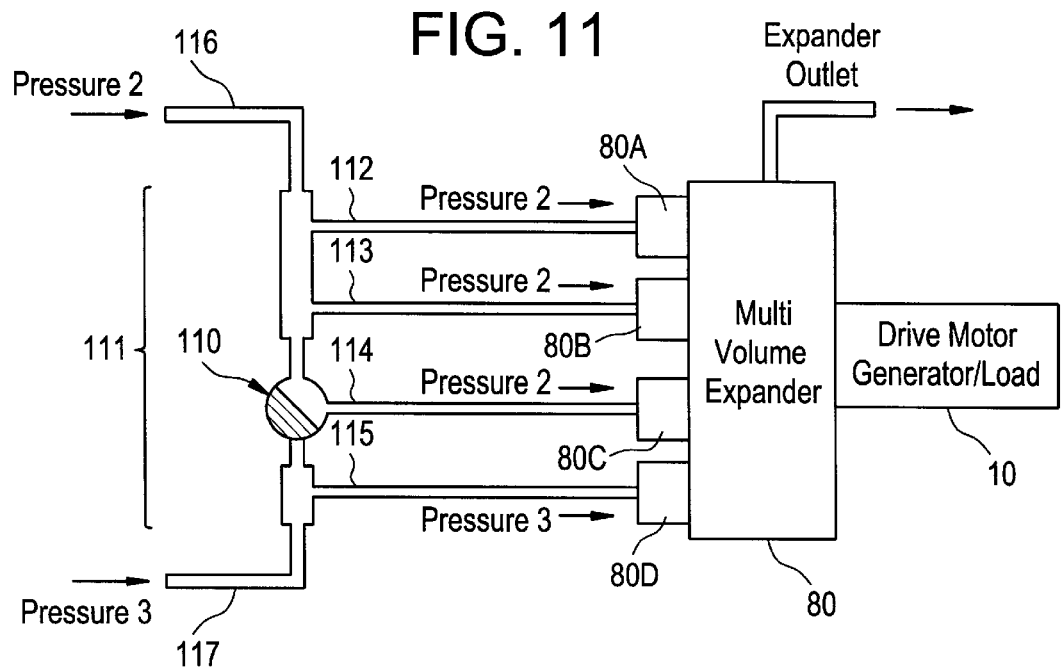

Fuel cell process control for multi-volume compressors and/or expanders is illustrated in FIG. 10 for compression and FIG. 11 for expansion. Both of these figures depict the ability to actively redirect the gas flow to one or more destinations.

FIG. 10 shows a multi-volume compressor 70 with four separate compressing chambers, 70A–70D. A solenoid actuated valve or proportional valve 100 is situated in output manifold 101 for flow control over outlet lines 102 and 103.

FIG. 11 shows a multi-volume expander 80 with four separate expander chambers, 80A–80D. A solenoid actuated valve or proportional valve 110 is situated in input manifold 111 for flow control over input lines 112–115.

In FIG. 10, the discharge gas stream to line 102 originates from one compression volume 70A under normal operating conditions. Under transient conditions, the output or some proportion of the output of a second cylinder 70B can be added to that of the first through the flow control valve 100. FIG. 11 shows an example of this type of flow control implementation for a fuel cell expander 80. The flow control valve 110 can connect expansion cylinder 80C to line 116 to allow for the addition; of expansion volumes for the gas flow from the fuel cell subsystem associated with line 116 and/or the subsystem associated with input line 117. This flexibility is useful for transient conditions in which the temperature of the expander feed stream from the fuel processor subsystem dramatically increases or decreases. Flow control valve 110 can either add or subtract, respective to hotter or colder, the appropriate number of expansion volumes to process the exhaust stream in order to maintain the necessary system pressure, yet still effectively handle the sudden change in gas density.

Figure 12:
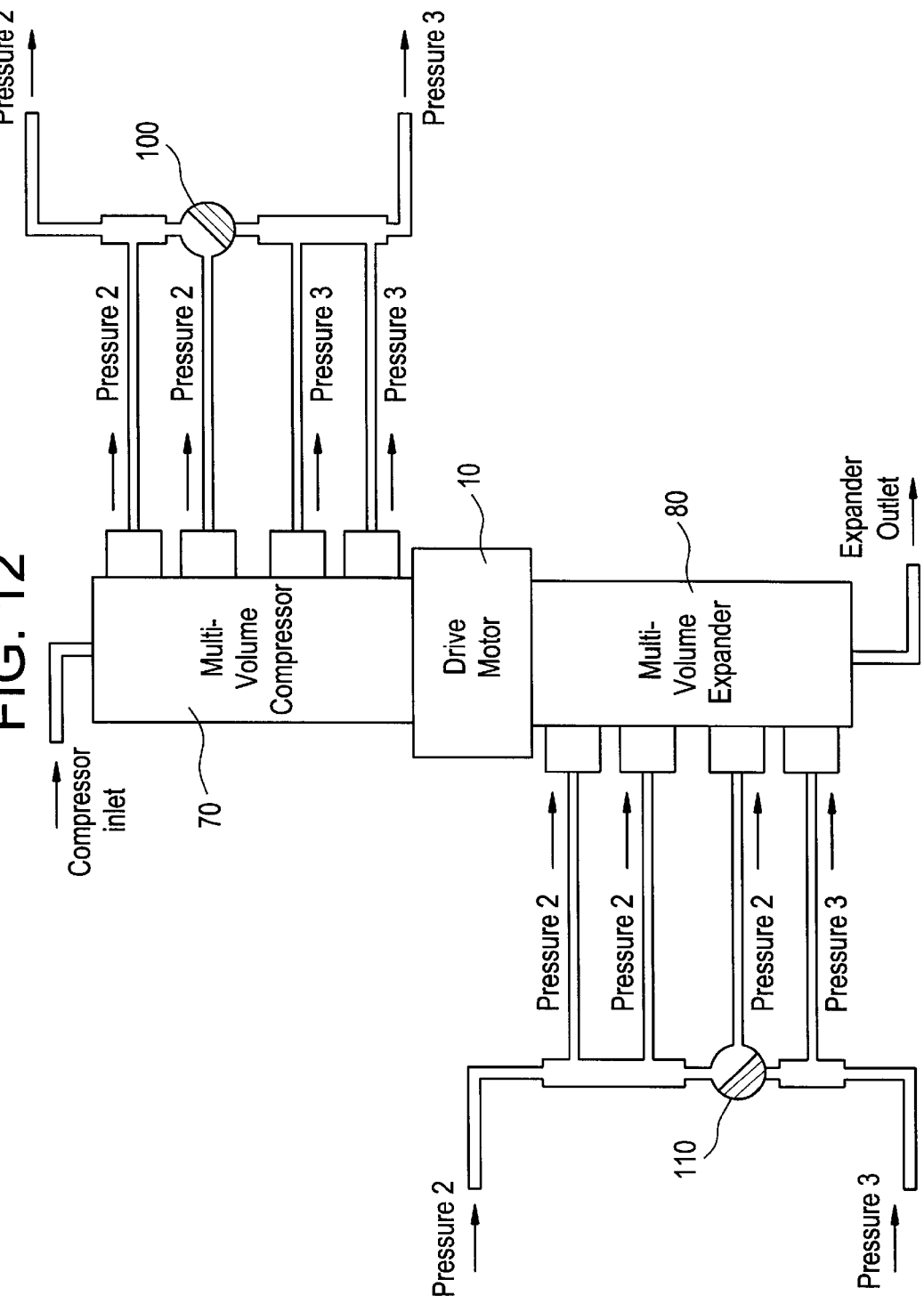
FIG. 12 shows a system with both compression and expansion incorporating flow control and with the compressor and expander driven from a single drive motor.

FIG. 12 illustrates a preferred embodiment of an integrated air supply system. This embodiment has only one drive motor 10, and therefore only one speed controller. The motor is connected to a multi-volume compressor 70 and multi-volume expander 80. The flow and pressure flexibility of this embodiment is further enhanced with the addition of flow directional control valves 100 and 110. A system as shown in FIG. 12 is capable of supplying the full spectrum of unique pressures and mass flows for dynamic, non steady-state applications.

Figure 13:
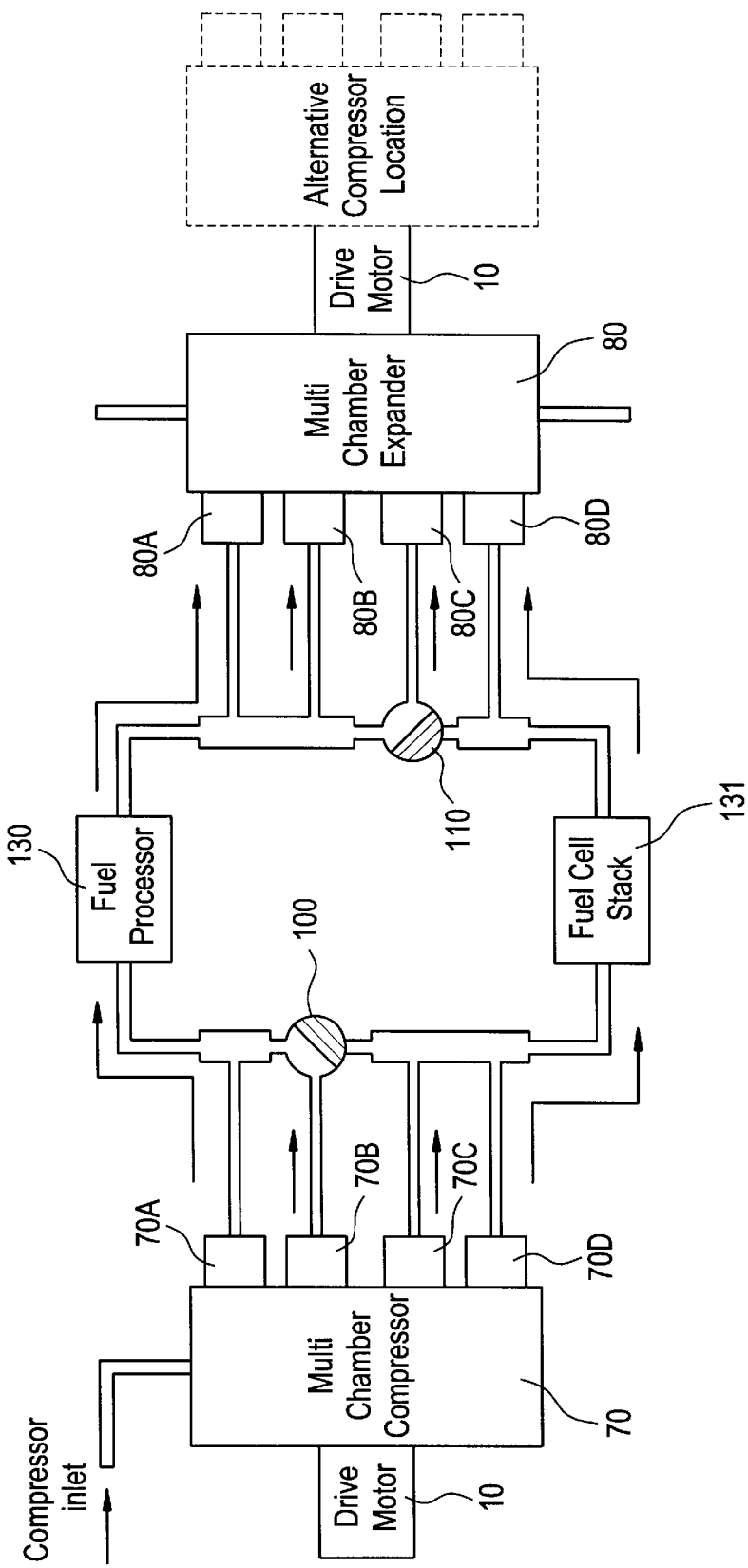
FIG. 13 illustrates the system of FIG. 12 used with a fuel cell stack and fuel processor.

FIG. 13 illustrates the air supply system of FIG. 12 in a fuel cell application, in which the two primary subsystems of the fuel cell powering system are depicted. For optimum performance, the fuel processor and the fuel cell stack require unique and different pressures.

FIG. 13 shows a multi-volume compressor 70 delivering compressed gas to a fuel processor 130 (which represents refining apparatus, a reformer), and delivering an oxidizing agent such as air to the fuel cell stack 131. Control over gas delivery is achieved through flow control valve 100.

Exhaust form the fuel processor 130 is delivered to multi-chamber expander 80 with flow control provided by valve 110. Exhaust from the fuel cell stack is delivered to expander 80 with appropriate flow control.

A significant operational characteristic of PEM fuel cells is the abundant use of water in all of the primary subsystems. Water management, which includes its use as well as recovery, is considered to be a critical issue. The currently favored water management approach taken by the fuel cell industry involves the traditional use of heat exchangers and condensers. However, both of these devices incur significant negative impacts on a fuel cell powering system through direct energy consumption and cause considerably larger package size and parts count.

Shown herein is an alternative water management apparatus that integrates the physics of gas expansion and the characteristics of actual expander/air motor devices in such a fashion that the energy costs of condensing water for recovery are dramatically reduced if not eliminated. In addition, the inherent controllability of the approach provides for a simple means of increasing or decreasing the water recovery rate while increasing the energy recoverability of the gas stream.

Figure 14:
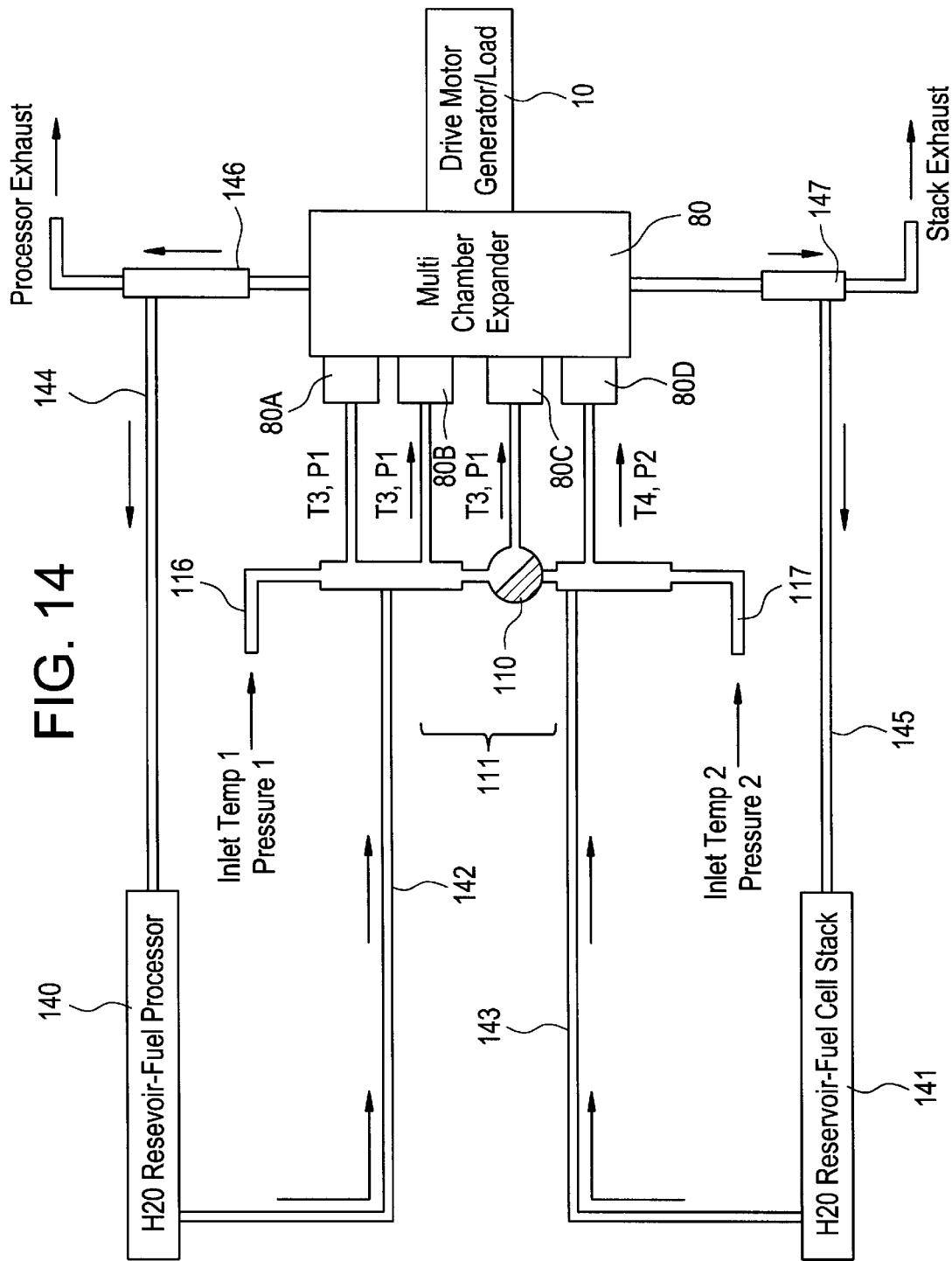
FIG. 14 illustrates a scheme for enhanced volume expansion through water injection.

FIG. 14 shows the expander part of a system, for illustrating water management. Multi-chamber expander 80 has four separate expansion chambers 80A–80D. A proportional flow control valve 110 is situated in the input manifold 111. Exhaust from the fuel processor, not shown, is delivered on input line 116 while exhaust from the fuel cell stack, not shown, is delivered on input line 117. A reservoir 140 collects water generated by the fuel processor while reservoir 141 collects water generated by the fuel cell stack. Line 142 connects reservoir 140 to manifold 111 and line 143 connects reservoir 141 to manifold 111. Water recovery lines 144 and 145 connect water condensers 146 and 147 to the two reservoirs, respectively.

For a fuel cell system utilizing a reformer apparatus, i.e. fuel processor, there is a significant, potentially recoverable, generated heat byproduct. The reformer exhaust gas stream has several characteristics that are important considerations when considering the implementation of an expander. These characteristics include the following: The temperature of the exhaust gas stream varies from 150° C. to perhaps as high as 350° C. for PEM systems and even higher for other fuel cell stack technologies. The exhaust gas stream is above the ambient pressure prior to entering an expander device, and the gas stream is not saturated with water vapor. In general, the exhaust gas stream from pressurized PEM fuel cells has a low relative humidity. The combination of these conditions is recognized herein as allowing the injection of water into the pressurized, hot exhaust stream. The introduction of water has a cooling effect on the exhaust stream as the liquid water is flashed to vapor. The immediate outcome is a decrease in the enthalpy of the exhaust stream and a significant increase in the volume flow rate due to the presence of the vapor (assuming that the flow rate through the expander is allowed to increase to prevent an undesirable increase in the subsystem pressure). While decreasing the enthalpy of the gas stream prior to expansion may seem to conflict with the desire to maximize energy recovery, expanders in a range of mass flow under 100 g/sec are not effective in recovering thermal energy. Instead, the form of energy that is most effectively recovered by this class of low energy expanders is volume and/or mass flow under pressure. Since the injection of water converts thermal energy into a more useable form, volume, the system performance is made considerably more efficient. An additional benefit in lowering the temperatures is the enabling of a wider choice of materials for the apparatus by avoiding the difficulties that a 250° C. to 350° C. temperature would present.

Water injection prior to the expander also allows for an enhanced water management strategy. In particular, the rate of liquid water recovery, after the expansion process, can be increased or decreased as a function of the proximity to the humidity saturation line that the pre-expander gas stream is driven to by additional water injection. If the fuel cell powering system is in an operational mode that generates excess water, it would be desirable to increase the water vapor loss rate from the system. It may also be preferable to have the water leave in a vapor form (as it currently does for internal combustion engines). If the loss of water in a vapor form is desired, then additional water can be injected into the expander inlet stream at a rate such that after expansion, and the associated temperature drop, the gas stream is still not fully saturated. As a consequence, water will not condense out of the exhaust stream and can escape into the environment. This release of water in a vapor form would be advantageous over the release of liquid water into an environment if that environment were below the freezing point of water. Automotive fuel cells as well as outdoor installed stationary fuel cells are two applications that would benefit from this water management approach.

If a fuel cell powering system is generating a net consumption of water, the strategy described above could be used to increase liquid water recovery after expansion. Depending upon the degree to which liquid water recovery needed to be increased, the water injection rate into the pre-expander gas stream is increased. Additional water injection drives the gas exhaust stream closer to the water saturation line prior to expansion. When the gas stream passes through an expander, the cooling effect of expansion drives the gas stream to the 100% saturation line thereby condensing any excess water. The amount of condensation is a function of the proximity of the pre-expander gas stream to the 100% saturation line. The recovery of water in this fashion precludes the need for energy consuming condensers 146 and 147 on the exhaust stream, if the fuel cell powering system generates a net excess of water for some significant portion of its operational duty cycle. When this is not the case, a much smaller condenser is installed after the expansion process to marginally increase the water recovery rate. A large liquid holding tank could also be used or some combination of both. For the process to produce the desired results, it is important that the expansion device be able to handle large quantities of condensation.

Multi-volume expansion is shown in FIG. 14. This system shows isolated water injection and recovery loops. This is advantageous where cross contamination of the fuel cell subsystems is a significant issue and can occur if all of the fuel cell subsystem exhausts are combined. Multi-volume expansion is also advantageous if the fuel cell subsystem exhaust streams are significantly different in temperature and pressure. Mixing gas streams at different state conditions is inherently inefficient with regard to energy recovery.

Figure 15:
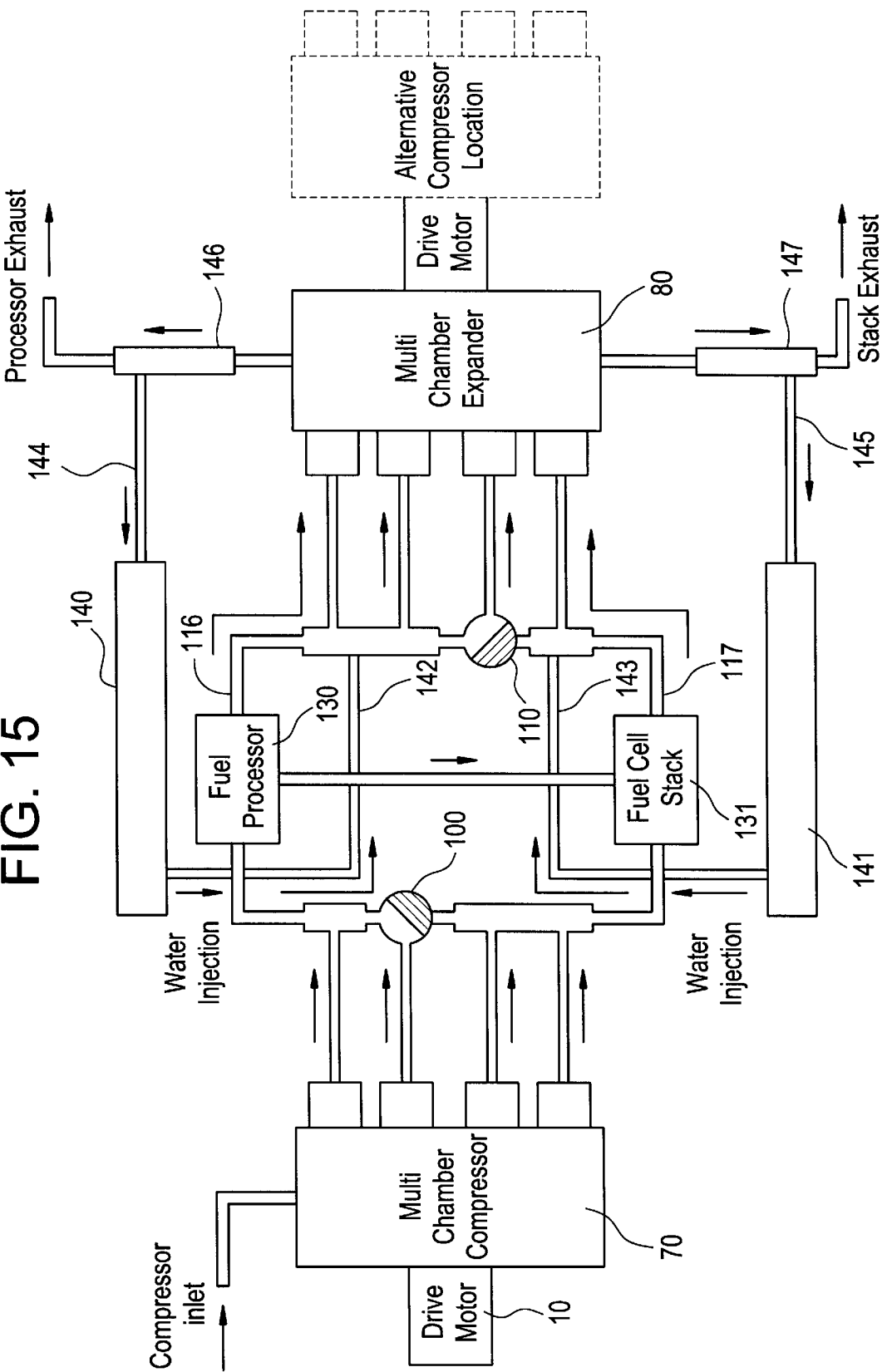
FIG. 15 shows the fuel cell system of FIG. 13 incorporating the water management scheme of FIG. 14.

FIG. 15 illustrates the previously described system control approaches integrated into a fuel cell application. FIG. 15 shows drive motor 10, multi-chamber compressor 70, and multi-chamber expander 80. Preferably both the compressor and the expander are driven by the same motor 10 as explained supra, but the compressor and expander are shown as separated on FIG. 15 only for ease of showing the various connecting lines in the air and water flow schematic diagram. A fuel cell stack 131 and a fuel processor 130 are fed compressed gases through flow control valve 100. Exhaust gases are delivered to expander 80 through flow control valve 110. Water management is achieved as explained above.

A multi-compression device, whether piston, diaphragm, stacked scroll, stacked roots, etc. can deliver a multiple of the same or different mass flows and/or discharge pressures at the same time using only one drive motor. The preferred embodiment of this approach utilizes only one drive motor and controller for all compressing systems.

A multi-cylinder expander can be developed from a number of existing pump technologies, including piston, diaphragm, stacked scrolls, and stacked twin screws. Such a device receives a multiple of different mass flows at the same pressure, yet maintains separation of the flow streams. The device receives a multiple of different inlet pressures without the need, cost, complexity or undesirable mixing of these different flows. It can receive any combination of the above conditions. The preferred embodiment of this approach uses the compressor drive motor for power. The expander could also be connected to an alternative power source such as an alternator/generator.

The drive motor can be directly connected to drive all or some of the compressors and expanders, or a flexible connection through different pulleys/belts/gears/etc. can be used. Variable drive ratios can be accomplished with variable speed pulleys, variable speed gear trains, or variable speed transmissions. The effect of variable drive ratios, variable mass flow and/or pressure at the same motor speed, can also be accomplished with variable valve timing. Variable valve timing can be implemented in either a compressor or an expander.

Under transient conditions, such as starting, stopping, and acceleration, gas flow ratios between the fuel cell stack, and the various fuel processor components changes dramatically. Better differentiated flow, required to match these changing a r ratios, can be obtained from a multiple cylinder compressor, piston, diaphragm, etc. with the use of either an open/close solenoid valve or a proportional valve that connects the discharge of one or more cylinders, diaphragm, etc. to flow to more than one location. Additional mass balancing can be accomplished by adjusting the rotational speed of the drive motor.

Under the same type of transient conditions described above, better differentiated gas flow from fuel cell powering system components can be accomplished by the use of on/off or proportional solenoid valves to direct the inlet flow of one or all gas streams to a variable number of the multiple cylinders, pistons, diaphragms available in the expander device. Under such conditions, the number of expansion areas may be too great in which case those unnecessary expansion areas would be bypassed entirely or opened to the ambient to reduce parasitic losses or better match the various flow requirements.

Variable timing valves offer several system benefits in the control of a fuel cell powering system. These advantages include (1) auxiliary pressure control valves, valve motors or their controllers; (2) variable timing valves incorporated into multiple expansion devices allows for a multiple of different system pressures and/or mass flow ratios and/or both during steady state conditions; and (3) variable timing valves offer the opportunity to maximize energy recovery for best overall fuel cell system performance, response, power up or powering down by rapidly providing alternative operating pressure and/or mass flow strategies under transient operation.

Control over the various gaseous supply systems shown in the figures can be automated through sensors and a central control unit as shown in FIGS. 1 and 2 to provide adjustment as needed to the drive motor speed, timing valves, variable speed transmissions and flow control valves, in whatever combination these devices are incorporated into the various gaseous supply systems.

While the invention has been shown and described with reference to preferred embodiments thereof, it should be understood that changes in the form and details of the invention may be made therein without departing from the spirit and scope of the invention.

What is claimed is:

1. A fuel cell powering system comprising
    a fuel cell stack;
    a fuel processor connected to said fuel cell stack for the delivery of fuel to said stack;
    a multi-chamber compressor, each compression chamber delivering gaseous output separate from the output of the other compression chambers, a first portion of said compression chambers connected to supply compressed gas to said fuel processor and a second portion of said compression chambers connected to supply compressed gas to said fuel cell stack;
    a multi-chamber expander, each expansion chamber receiving gaseous exhaust separate from the input of the other expansion chambers, a first portion of said expansion chambers connected to receive gaseous exhaust from said fuel processor and a second portion of said expansion chambers connected to receive exhaust from said fuel cell stack;
    one or more flow control devices connected to at least one of said multi-chamber compressor and said multi-chamber expander; and
    at least one water line connected to enable the injection of water into at least one of the exhaust gas streams prior to expansion.

2. The system of claim 1 wherein said flow control devices include
    one or more first proportional valves connected to said multi-chamber compressor, said one or more proportional valves enabling a variation in the number of compression chambers connected to said fuel cell stack and/or said fuel processor.

3. The system of claim 1 wherein said flow control devices include
    one or more second proportional valves connected to said multi-chamber expander, said one or more proportional valves enabling a variation in the number of expander chambers connected to said fuel cell stack and/or said fuel processor.

4. The system of claim 3 wherein said at least one water line includes
    a first water line connected to inject water into an operatively generated fuel cell stack exhaust stream prior to the entry of said fuel cell stack exhaust stream into one or more chambers of said multi-chamber expander.

5. The system of claim 3 wherein said at least one water line includes
    a second water line connected to inject water into an operatively generated fuel processor exhaust stream prior to the entry of said fuel processor exhaust stream into one or more chambers of said multi-chamber expander.

6. The system of claim 3 wherein said at least one water line includes
    a first water line connected to inject water into an operatively generated fuel cell stack exhaust stream prior to the entry of said fuel cell stack exhaust stream into one or more chambers of said multi-chamber expander; and
    a second water line connected to inject water into an operatively generated fuel processor exhaust stream prior to the entry of said fuel processor exhaust stream into one or more chambers of said multi-chamber expander.

7. The system of claim 1 wherein said flow control devices include
    one or more first proportional valves connected to said multi-chamber compressor, said one or more proportional valves enabling a variation in the number of compression chambers connected to said fuel cell stack and/or said fuel processor; and
    one or more second proportional valves connected to said multi-chamber expander, said one or more proportional valves enabling a variation in the number of expander chambers connected to said fuel cell stack and/or said fuel processor.

8. The system of claim 7 wherein said at least one water line includes
    a first water line connected to inject water into an operatively generated fuel cell stack exhaust stream prior to the entry of said fuel cell stack exhaust stream into one or more chambers of said multi-chamber expander.

9. The system of claim 7 wherein said at least one water line includes
    a second water line connected to inject water into an operatively generated fuel processor exhaust stream prior to the entry of said fuel processor exhaust stream into one or more chambers of said multi-chamber expander.

10. The system of claim 7 wherein said at least one water line includes
    a first water line connected to inject water into an operatively generated fuel cell stack exhaust stream prior to the entry of said fuel cell stack exhaust stream into one or more chambers of said multi-chamber expander; and
    a second water line connected to inject water into an operatively generated fuel processor exhaust stream prior to the entry of said fuel processor exhaust stream into one or more chambers of said multi-chamber expander.

11. The system of claim 1 further including
a drive motor and a drive shaft connected to said drive motor, said compressor and said expander both driven from said drive shaft.

12. The system of claim 11 wherein said multi-chamber compressor is comprised of
a first compressor apparatus connected to said fuel cell stack; and
a second compressor apparatus connected to said fuel processor.

13. The system of claim 12 further including
a differential drive system connected to said drive shaft and to one of said first compressor apparatus or said second compressor apparatus to provide a speed differential between the first and second compressors.

14. The system of claim 13 wherein said differential drive is a variable speed drive.

15. The system of claim 2 further including
a drive motor and a drive shaft connected to said drive motor, said compressor and said expander both driven from said drive shaft.

16. The system of claim 15 wherein said multi-chamber compressor is comprised of
a first compressor apparatus connected to said fuel cell stack; and
a second compressor apparatus connected to said fuel processor.

17. The system of claim 16 further including
a differential drive system connected to said drive shaft and to one of said first compressor apparatus or said second compressor apparatus to provide a speed differential between the first and second compressors.

18. The system of claim 17 wherein said differential drive is a variable speed drive.

19. The system of claim 1 wherein said flow control devices include one or more by-pass valves to connect the outlet of a compression chamber to an inlet of said compressor.

20. The system of claim 1 wherein said flow control devices include one or more throttling valves connected to said compressor.

21. The system of claim 1 wherein said flow control devices include one or more venting valves connected to said compressor.

22. The system of claim 1 further including
a servo system connected to control at least one element of said fuel cell powering system.

23. The system of claim 2 further including
a servo system connected to control at least one element of said fuel cell powering system.

24. The system of claim 14 further including
a servo system connected to control at least one element of said fuel cell powering system.

25. The system of claim 15 further including a servo system connected to control at least one element of said fuel cell powering system.

26. The system of claim 17 further including
a servo system connected to control at least one element of said fuel cell powering system.

27. The system of claim 18 further including
a servo system connected to control at least one element of said fuel cell powering system.

28. The system of claim 19 further including
a servo system connected to control at least one element of said fuel cell powering system.

29. The system of claim 20 further including
a servo system connected to control at least one element of said fuel cell powering system.

30. The system of claim 21 further including
a servo system connected to control at least one element of said fuel cell powering system.

31. A fuel cell powering system comprising
a fuel cell stack;
a fuel processor connected to said fuel cell stack for delivery of fuel to said stack;
a first compressor connected to supply a first gaseous stream to said fuel processor;
a second compressor connected to supply a second gaseous stream to said fuel cell stack;
a drive motor and a drive shaft connected to said drive motor, said first compressor and said second compressor both driven from said drive shaft; and
a differential drive system connected to said drive shaft and to one of said first compressor and said second compressor to provide a speed differential between the first and second compressors.

32. The system of claim 31 further including one or more flow control devices connected to at least one of said compressors to control mass flow and pressure therefrom.

33. The system of claim 32 wherein said flow control devices include a by-pass valve to connect the outlet of one of the compressors to an inlet of the same compressor.

34. The system of claim 32 wherein said flow control devices include one or more throttling valves connected to at least one of the compressors.

35. The system of claim 32 wherein said flow control devices include one or more venting valves connected to at least one of the compressors.

36. The system of claim 32 wherein at least one of said compressors is a multi-chamber compressor, each compression chamber operatively connected to deliver gaseous output separate from the output of the other compression chambers.

37. The system of claim 36 wherein said flow control devices include one or more proportional valves connected to said multi-chamber compressor, said one or more proportional valves enabling a variation in the number of chambers connected to supply said fuel cell stack and/or said fuel processor.

38. The system of claim 31 wherein said differential drive system is a variable speed drive.

39. The system of claim 38 further including one or more flow control devices connected to at least one of said compressors to control mass flow and pressure therefrom.

40. The system of claim 39 wherein said flow control devices include a by-pass valve to connect the outlet of one of the compressors to an inlet of the same compressor.

41. The system of claim 39 wherein said flow control devices include one or more throttling valves connected to at least one of the compressors.

42. The system of claim 39 wherein said flow control devices include one or more venting valves connected to at least one of the compressors.

43. The system of claim 39 wherein at least one of said compressors is a multi-chamber compressor, each compression chamber operatively connected to deliver gaseous output separate from the output of the other compression chambers.

44. The system of claim 39 wherein said flow control devices include one or more proportional valves connected to said multi-chamber compressor, said one or more proportional valves enabling a variation in the number of chambers connected to supply said fuel cell stack and/or said fuel processor.

45. The system of claim 31 further including
a servo system connected to control at least one element of said fuel cell powering system.

46. The system of claim 32 further including
a servo system connected to control at least one element of said fuel cell powering system.

47. The system of claim 38 further including
a servo system connected to control at least one element of said fuel cell powering system.

48. The system of claim 39 further including
a servo system connected to control at least one element of said fuel cell powering system.

49. A fuel cell powering system comprising
a fuel cell stack;
a fuel processor connected to said fuel cell stack for delivery of fuel to said stack;
a multi-chamber compressor, each compression chamber operatively connected to deliver fluid output separate from the output of the other compression chambers, a first portion of said compression chambers connected to supply said fuel processor and a second portion of said compression chambers connected to supply said fuel cell stack; and
one or more proportional valves connected to said compressor enabling a variation in the number of compression chambers connected to supply at least one of said fuel cell stack and said fuel processor.

50. The system of claim 49 further including
a servo system connected to control at least one element of said fuel cell powering system.

51. A fuel cell powering system comprising
a fuel cell stack operatively producing a first exhaust stream;
a fuel processor connected to said fuel cell stack for delivery of fuel to said stack, said fuel processor operatively producing a second exhaust stream;
a multi-chamber expander, each expansion chamber having an inlet separate from the inlet of the other expansion chambers, a first portion of the expansion chambers connected to receive said first gaseous exhaust stream, and a second portion of the expansion chambers connected to receive said second gaseous exhaust stream; and
at least one water supply line connected to inject water into at least one of the said exhaust streams prior to expansion.

52. A method of supplying motive power to a fuel pump/compressor and a gaseous fluid compressor from a common motive source in a fuel cell powering system comprising
providing a drive shaft connected to said common motive source;
providing a fuel supply comprising said fuel pump/compressor connected to said drive shaft;
providing a gaseous fluid supply comprising said gaseous fluid compressor connected to said drive shaft;
providing a differential drive system connected to said drive shaft and interposed between said drive shaft and one of said fuel pump/compressor and said gaseous fluid compressor to provide a speed differential drive system therebetween;
providing a fuel cell stack; and
providing a connection between said gaseous fluid compressor and said fuel cell stack and providing a connection between said fuel pump/compressor and said fuel cell stack to provide oxidizing agent and oxidant to said stack.

53. The method of claim 52 further including
providing a variable speed mechanism within said differential drive system to enable different speed ratios between the fuel supply and the gaseous fluid supply to further enable dynamic changes in the fuel/gaseous fluid ratio during operation of said fuel cell powering system.

54. The method of claim 52 further including
providing a controller connected to said common motive source to supply power to said motive source; and
providing a servo system connected to said controller for controlling the power supplied to said common motive source and thereby control the speed of said fuel pump/compressor and said gaseous fluid compressor.

55. The method of claim 53 further including providing a controller connected to said common motive source to supply power to said motive source; and
providing a servo system connected to said controller for controlling the power supplied to said common motive source and for controlling said variable speed mechanism to thereby control the speed of said fuel pump/compressor and said gaseous fluid compressor and the fuel/gaseous fluid ratio.

56. A method of altering fuel/air flow ratios supplied to a fuel cell stack in a fuel cell powering system comprising
providing a motive source;
providing a drive shaft connected to said motive source;
providing a fuel supply comprising a fuel pump/compressor connected to said drive shaft;
providing an air supply comprising an air compressor connected to said drive shaft;
providing a first connection line between said air compressor and said fuel cell stack and a second connection line between said fuel pump/compressor and said fuel cell stack for providing fuel and air to said fuel cell stack in a fuel/air ratio; and
providing at least one flow control device in at least one of said first connection line and said second connection line for controlling said fuel/air ratio.

57. The method of claim 56 further including
providing a by-pass valve as at least one of the flow control devices to allow a portion of the flow in the associated connection line to be shunted back to the input of the associated compressor.

58. The method of claim 56 further including
providing at least one venting valve as at least one of the flow control devices to allow a portion of the flow in the associated connection line to vent to the atmosphere.

59. The method of claim 56 further including
providing at least one throttling valve as a flow control device on the input of at least one of said compressors.

60. The method of claim 56 further including
providing a first plurality of compression chambers to act as said air compressor, each compression chamber delivering an output separate from the output of the other compression chambers;
providing a first manifold to receive the output of said first plurality of said compression chambers, said first manifold connected to said first connection line; and providing at least one first proportional valve in said first manifold as one of the flow control devices for altering the number of compression chambers supplying an output through said first manifold to said first connection line.

61. The method of claim 60 further including providing a second plurality of independent compression chambers wherein said fuel pump/compressor is comprised of said second plurality of independent compression chambers;

providing a second manifold to receive the output of said second plurality of compression chambers, said second manifold connected to said second connection line; and providing at least one second proportional valve in said second manifold as one of the flow control devices for altering the number of compression chambers supplying an output through said second manifold to said second connection line.

62. The method of claim 56 further including providing a first plurality of compression chambers to act as said air compressor, each compression chamber delivering an output separate from the output of the other compression chambers;

providing a first manifold to receive the output of said first plurality of said compression chambers, said first manifold connected to said first connection line; and providing timing valves as one of the flow control devices, each compression chamber having a timing valve.

63. The method of claim 62 further including providing at least one first proportional valve in said first manifold as one of the flow control devices for altering the number of compression chambers supplying an output through said first manifold to said first connection line.

64. The method of claim 56 further including providing a second plurality of independent compression chambers wherein said fuel pump/compressor is comprised of said second plurality of independent compression chambers;

providing a second manifold to receive the output of said second plurality of compression chambers, said second manifold connected to said second connection line; and providing timing valves as one of the flow control devices, each compression chamber having a timing valve.

65. The method of claim 64 further including providing at least one second proportional valve in said second manifold as one of the flow control devices for altering the number of compression chambers supplying an output through said manifold to said second connection line.

66. The method of claim 56 further including providing a servo system connected to at least one said flow control device for dynamically controlling said fuel/air ratio.

67. The method of claim 57 further including providing a servo system connected to at least one said flow control device for dynamically controlling said fuel/air ratio.

68. The method of claim 58 further including providing a servo system connected to at least one said flow control device for dynamically controlling said fuel/air ratio.

69. The method of claim 59 further including providing a servo system connected to at least one said flow control device for dynamically controlling said fuel/air ratio.

70. The method of claim 60 further including providing a servo system connected to at least one said flow control device for dynamically controlling said fuel/air ratio.

71. The method of claim 61 further including providing a servo system connected to at least one said flow control device for dynamically controlling said fuel/air ratio.

72. The method of claim 62 further including providing a servo system connected to at least one said flow control device for dynamically controlling said fuel/air ratio.

73. The method of claim 63 further including providing a servo system connected to at least one said flow control device for dynamically controlling said fuel/air ratio.

74. The method of claim 64 further including providing a servo system connected to at least one said flow control device for dynamically controlling said fuel/air ratio.

75. The method of claim 65 further including providing a servo system connected to at least one said flow control device for dynamically controlling said fuel/air ratio.

76. The method of claim 56 further including providing a first plurality of independent compression chambers to act as said air compressor;

providing a first manifold to receive the output of said first plurality of compression chambers, said first manifold connected to said first connection line;

providing a second plurality of independent compression chambers to act as said fuel pump/compressor;

providing a second manifold to receive the output of said second plurality of compression chambers, said second manifold connected to said second connection line; and providing an expander connected to said drive shaft, said expander connected to receive an exhaust stream from said fuel cell stack to recover power from said exhaust stream.

77. The method of claim 76 further including providing said expander with a plurality of independent expander chambers; and providing variable timing valves on said expander, each said independent expander chamber having a timing valve.

78. The method of claim 77 further including a servo system connected to said timing valves for adjusting the time that said timing valves are open or closed.

79. The method of claim 78 wherein said servo system is connected to at least one said flow control device for dynamically controlling said fuel/air ratio.

80. A method of handling changing exhaust volumes during the operation of a fuel, cell powering system comprising providing a fuel cell stack which operatively produces an exhaust stream;

providing an expander with a plurality of independent compression chambers connected to a manifold which receives said exhaust stream; and providing variable timing valves on said expander, each said independent chamber having a timing valve.

81. The method of claim 80 further including a servo system connected to said timing valve for adjusting the time that said timing valves are open or closed.

82. A method of handling changing exhaust volumes during the operation of a fuel cell powering system comprising providing a fuel cell stack which operatively produces an exhaust stream;

providing an expander with a plurality of independent compression chambers connected to a manifold which receives said exhaust stream; and providing at least one proportional valve in said manifold for altering the number of independent chambers connected to receive said exhaust stream.

83. The method of claim 82 further including providing variable timing valves on said expander, each said independent chamber having a timing valve.

84. The method of claim 83 further including a servo system connected to said timing valves for adjusting the time said timing valves are open or closed and connected to said proportional valves for controlling the number of independent chambers receiving said exhaust stream.

85. A method of water management during the operation of a fuel cell powering system comprising providing a fuel cell stack;

providing an expander to receive an exhaust stream operatively generated by said fuel cell stack; and providing a water line to inject water into said exhaust stream prior to expansion of said exhaust stream in said expander.

86. The method of claim 85 further including providing a water recovery line connected to the output of said expander; and providing a water reservoir connected to said water recovery line.

87. The method of claim 85 further including providing a fuel processor connected to said fuel cell stack to supply fuel to said stack;

providing a connecting line from said fuel processor to said expander for recovering energy in an operatively generated fuel processor exhaust stream; and providing a second water line to inject water into said fuel processor exhaust stream in said expander.

88. The method of claim 87 further including providing said expander with a plurality of independent chambers, a first portion of said chambers connected to receive the exhaust stream from said fuel cell stack and a second portion of said independent chambers connected to receive said fuel processor exhaust stream.

89. The method of claim 88 further including providing at least one proportional valve on the inlet of said expander to alter the number of independent chambers connected to at least one of the exhaust streams.

90. The method of claim 89 further including providing a servo system connected to control the setting of said at least one proportional valve.

91. A method of water management during the operation of a fuel cell powering system comprising providing a fuel cell stack;

providing a fuel processor connected to said fuel cell stack for providing fuel to said stack;

providing an expander connected to receive an exhaust stream operatively generated by said fuel processor; and providing a water line to inject water into the fuel processor exhaust stream prior to expansion.

92. The method of claim 91 further including providing a water recovery line connected to the output of said expander; and providing a water reservoir connected to said water recovery line.

93. A method of supplying motive power to a fuel cell powering system comprising providing a fuel cell stack;

providing a common motive source;

providing a drive shaft connected to said common motive source;

providing a compressor connected to said drive shaft for operatively producing a gaseous stream for delivery to said fuel cell stack;

providing an expander connected to said drive shaft for operatively receiving an exhaust stream produced by said fuel cell stack; and a first differential drive interposed between said drive shaft and one of said compressor and said expander to provide a speed differential therebetween.

94. The method of claim 93 further including providing a first variable speed mechanism within said first differential drive system to enable dynamic control of said powering system.

95. The method of claim 93 further including providing a second differential drive interposed between said drive shaft and one of said compressor and said expander.

96. The method of claim 95 further including providing a second variable speed mechanism within said second differential drive system to enable dynamic control of said powering system.

97. The method of claim 96 further including providing a first variable speed mechanism within said first differential drive system to enable dynamic control of said powering system.

98. The method of claim 94 further including providing a servo system connected to control said first variable speed mechanism.

99. The method of claim 96 further including providing a servo system connected to control said second variable speed mechanism.

100. The method of claim 97 further including providing a servo system connected to control said first variable speed mechanism and said second variable speed mechanism.

* * * * *